Sept. 18, 1945.    W. W. GARSTANG    2,384,830
VOLTAGE MODIFYING CIRCUIT
Filed April 12, 1943
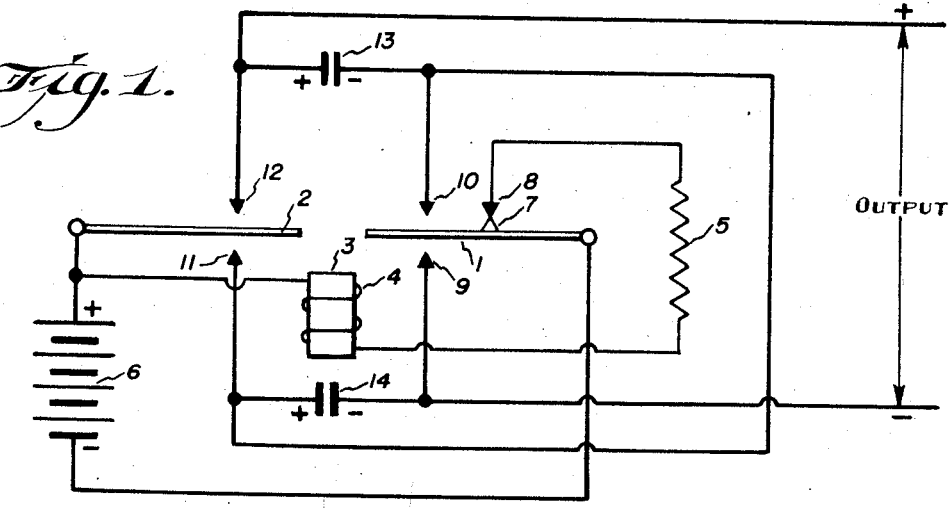
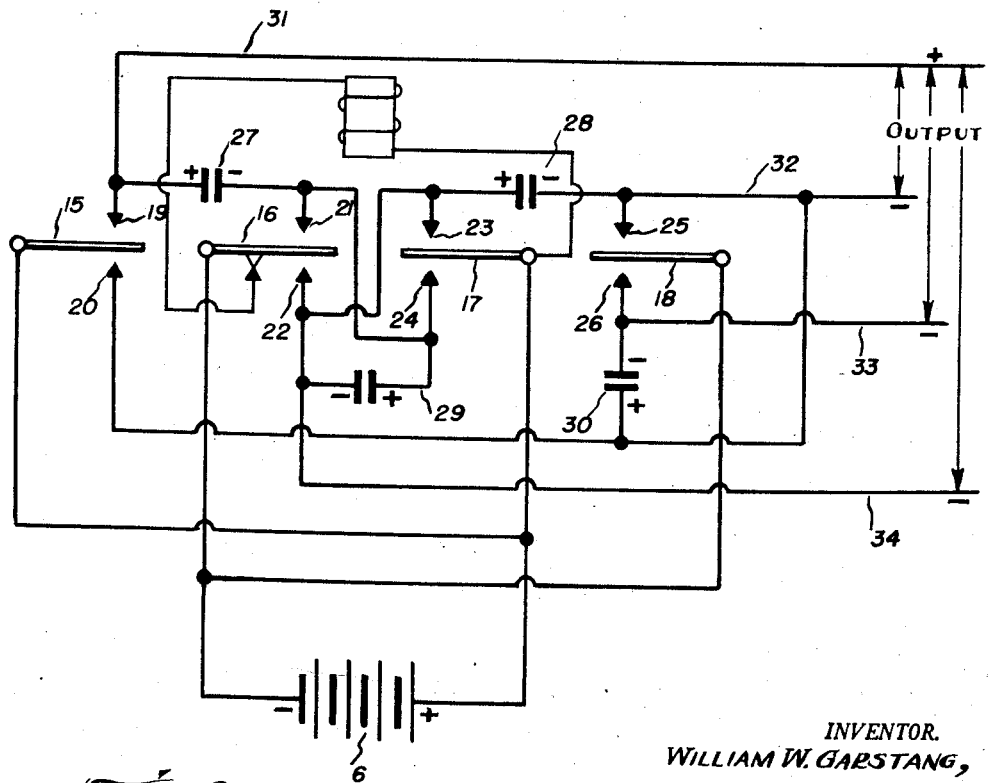
INVENTOR.
WILLIAM W. GARSTANG,
BY:
W. P. Hahn
ATTORNEY Patented Sept. 18, 1945

2,384,830

UNITED STATES PATENT OFFICE 2,384,830

VOLTAGE MODIFYING CIRCUIT

William W. Garstang, Indianapolis, Ind., assignor to Electronic Laboratories, Incorporated, Indianapolis, Ind., a corporation of Indiana Application April 12, 1943, Serial No. 482,736

6 Claims. (Cl. 171—97)

The present invention relates to improvements in electric systems adapted to modify the voltage delivered from a source of power to a load.

One of the objects of the present invention is to provide a system wherein there is provided a plurality of storage capacitors or condensers adapted to be alternately connected to the source of supply by the operation of suitable switching mechanism, preferably of the vibrating type, to charge the condensers or capacitors while the switch contacts are in closed position and arranged to discharge to the load while the switch contacts are in open or neutral position.

Another object of the invention is to provide a full wave discharge from the condensers during the operation of the intermittently operated switches.

A still further object of my invention is to provide a voltage multiplying system whereby various multiples of the voltage of the supply source may be supplied simultaneously or separately, as desired, to a load or to different loads.

For the purpose of disclosing my invention, I have illustrated certain embodiments of the same in the accompanying drawing, in which:

Fig. 1 is a diagrammatic view of a circuit arrangement embodying my invention; and Fig. 2 is a diagrammatic view of another embodiment of my invention, in which I have provided for a number of multiples of the voltage multiplications.

In the circuit disclosed in Fig. 1, I provide a pair of vibrating reeds 1 and 2 vibrated by a suitable electromagnet 3 having an energizing winding 4 and having included in its circuit a suitable resistance 5. The winding 4 is connected to a suitable source of supply, as for instance, a battery 6, and this circuit is controlled by contacts 7 and 8, one of which, 7, is carried by the reed 1. Cooperating with reed 1 is a pair of relatively stationary contacts 9 and 10, one on each side of the reed, and a similar pair of contacts 11 and 12 cooperate with the reed 2. A condenser or storage capacitor 13 is connected between contacts 10 and 12 and a similar condenser, 14, is connected between the contacts 9 and 11. Contacts 10 and 11 are electrically connected, while contacts 9 and 12 are respectively connected to the minus and plus output leads. Reeds 2 and 1 are respectively connected to the plus and minus side of the battery 6.

Therefore, when reeds 1 and 2 are in engagement respectively with contacts 10 and 12, the condenser 13 will receive a charge from the battery and condnser 14 will be discharging in series with the battery across the output. When the reeds 1 and 2 are in engagement with contacts 9 and 11 respectively, the condenser 14 will be receiving a charge and the condenser 13 will be discharging with the battery across the output. When the reeds 1 and 2 are in neutral position then condensers 13 and 14 will be discharging in series across the output. Due to the rapid vibration of reeds 1 and 2, the charging and discharging of the condensers occurs with extreme rapidity. Accordingly the voltage of the battery is substantially doubled and a full wave discharge is provided to the output side.

In the circuit shown in Fig. 2, I have illustrated an arrangement whereby various multiples of voltage may be derived from one circuit, either separately or simultaneously. In the arrangement, I provide two pairs of vibrating members or reeds, one pair consisting of the reeds 15 and 16 and the other pair consisting of the reeds 17 and 18. The reed 15 operates between relatively stationary contacts 19 and 20; reed 16 operates between contacts 21 and 22; reed 17 operates between contacts 23 and 24; and reed 18 operates between contacts 25 and 26. A condenser or storage capacitor 27 is connected between contacts 19 and 21; a second condenser 28 is connected between contacts 23 and 25; a third condenser 29 is connected between contacts 22 and 24; and a fourth condenser 30 is connected between contacts 20 and 26. Contacts 21 and 24 are connected together as are contacts 22 and 23. Reeds 15 and 17 are connected to the plus side of the battery 6, or other source of supply. While reeds 16 and 18 are connected to the minus side of the battery. Contact 19 is connected to the plus side 31 of the output side of the circuit; contact 25 is connected to the minus lead 32, as is also contact 20; contact 26 is connected to the minus lead 33; contact 22 is connected to the minus lead 34. Accordingly, with the reeds 15 and 16 respectively engaging contacts 19 and 21 and reeds 17 and 18 engaging contacts 23 and 25, condensers 27 and 28 will be connected to the battery in parallel. Similarly, with the reeds 15 and 16 engaging contacts 20 and 22 and reeds 17 and 18 in engagement with contacts 24 and 26, condensers 29 and 30 will be connected to the battery in parallel. Thus, the pairs of condensers are alternately connected in parallel with the source of supply and are, accordingly, charged in parallel. However, with the reeds in neutral position, the condensers will discharge to the output side of the circuit and condensers 27 and 28 will discharge in series to the output leads 34 and 31, thus doubling the voltage delivered to the load connected to these leads. Likewise, condensers 27, 29 and 28 will be connected in series between leads 32 and 31, tripling the discharge voltage to a load connected to these leads, and condensers 27, 28, 29 and 30 will be connected in series between leads 31 and 33 quadrupling the voltage delivered to the load connected to these leads.

I claim as my invention:

1. In combination, a pair of storage capacitors normally connected in series between positive and negative output leads and a multiplicity of vibrating switches and cooperating stationary contacts connecting the capacitors of said pair alternately with a source of charging supply, said capacitors discharging to the output leads in series on each movement of the switches to neutral position.

2. In combination, a pair of storage capacitors normally connected in series between positive and negative output leads, and means for connecting the capacitors of said pair alternately with a charging source of supply, said capacitors discharging to the output leads during the period between their connection with the charging source.

3. In combination, a common output lead, a plurality of storage capacitors connected to said lead in series, a plurality of output leads to which only certain of said capacitors are connected in series, and means for connecting alternate groups of said capacitors in parallel with a source of power, said capacitors discharging serially to said respective output leads when said connecting means is in neutral position.

4. In combination, an output lead, a plurality of storage capacitors connected to said lead in series, a plurality of output leads respectively connected to only certain of said capacitors, a plurality of vibratory contacts and associated stationary contacts, connecting alternate groups of said capacitors in parallel with a source of power, said capacitors discharging in series during the neutral position of said vibratory contacts.

5. In combination, two pair of relatively stationary contacts, a capacitor connected between each pair, a pair of movable contact members cooperating with said stationary contacts and connected with a source of supply and engaging said stationary contacts to connect said capacitors in parallel with said source, two additional pair of relatively stationary contacts and an additional pair of movable contacts adapted to alternately engage said stationary contacts, a capacitor connected between each of said second pair of contacts and connected in parallel with said source of power when said second-mentioned pair of movable contacts engages said second-mentioned pair of stationary contacts, a common output lead to which all of said capacitors are connected in series and a plurality of output leads, one connected to two of said capacitors in series, another connected to three of said capacitors in series and a third connected to all of said capacitors in series, said capacitors discharging in series to said output leads when the movable contacts are in a neutral position and being charged when said movable contacts are engaging said stationary contacts to connect said capacitors in parallel with the source of power.

6. An electric circuit comprising a plurality of output leads, a plurality of storage capacitors connected with one of said output leads in series, all of said storage capacitors being connected in series with another of said output leads, a lesser number of said capacitors being connected in series with still another of said plurality of leads and a still lesser number of said capacitors being connected in series with still another of said leads, and means for connecting groups of said capacitors in parallel alternately with a source of supply.

WILLIAM W. GARSTANG.